(12) United States Patent
Gao et al.

(10) Patent No.: US 8,776,201 B2
(45) Date of Patent: Jul. 8, 2014

(54) METHOD FOR IMPLEMENTING UNIFIED AUTHENTICATION

(75) Inventors: Feng Gao, Beijing (CN); Shuaimin Ye, Beijing (CN); Lei Hong, Beijing (CN); Yanxia Chen, Beijing (CN); Huiming Li, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1310 days.

(21) Appl. No.: 11/920,565

(22) PCT Filed: Dec. 8, 2005

(86) PCT No.: PCT/CN2005/002127
§ 371 (c)(1),
(2), (4) Date: Feb. 4, 2009

(87) PCT Pub. No.: WO2006/122461
PCT Pub. Date: Nov. 23, 2006

(65) Prior Publication Data
US 2009/0217366 A1 Aug. 27, 2009

(30) Foreign Application Priority Data
May 16, 2005 (CN) .......................... 2005 1 0072981

(51) Int. Cl.
*G06F 7/04* (2006.01)
*H04L 9/32* (2006.01)
*H04L 29/06* (2006.01)

(52) U.S. Cl.
CPC .......... *H04L 63/0815* (2013.01); *H04L 9/3213* (2013.01)
USPC ................. 726/8; 726/21; 713/182

(58) Field of Classification Search
USPC .......................................................... 726/8
See application file for complete search history.

(56) References Cited

U.S. PATENT DOCUMENTS 5,339,403 A * 8/1994 Parker ........................... 711/221
6,275,941 B1 * 8/2001 Saito et al. ........................ 726/2
(Continued)

FOREIGN PATENT DOCUMENTS

| KR | 2004-048049 | 6/2004 |
| WO | WO 03/073687 | 9/2003 |

OTHER PUBLICATIONS

White Paper, Verisign Unified Authentication—The Next Generation of Strong Authentication. 2005. p. 1-18.*

*Primary Examiner* — Christopher Brown
(74) *Attorney, Agent, or Firm* — Patterson Thuente Pedersen, P.A.

(57) ABSTRACT

A method for implementing unified authentication for user logon, the method comprising the steps of: establishing an authentication server; creating a user authentication account number in the authentication server; storing user information which the user uses in a plurality of systems into the authentication server; associating, in the authentication server, the created user authentication account number with the user information which the user uses in the plurality of systems; and providing an authentication flag to the client of the user by the authentication server based on the association between the user authentication account number and the user information which the user uses in the plurality of systems established in the authentication server so that the user can log on the plurality of systems using the authentication flag. The present invention is applied to provide a unified mechanism of user logon authentication in integration and mergence of the service processes provided by a plurality of Internet information systems or Internet providers, and thus the user can access all authorized application systems or service providers with only one logon authentication.

8 Claims, 4 Drawing Sheets

(56) References Cited

U.S. PATENT DOCUMENTS

| | | | |
|---|---|---|---|
| 7,194,591 B2* | 3/2007 | Takemura et al. | 711/164 |
| 7,296,290 B2* | 11/2007 | Barriga et al. | 726/8 |
| 7,318,234 B1* | 1/2008 | Dharmarajan | 726/2 |
| 7,392,536 B2* | 6/2008 | Jamieson et al. | 726/8 |
| 7,441,263 B1* | 10/2008 | Bakshi et al. | 726/2 |
| 7,530,099 B2* | 5/2009 | Flurry et al. | 726/8 |
| 7,540,020 B1* | 5/2009 | Biswas et al. | 726/6 |
| 7,676,829 B1* | 3/2010 | Gui et al. | 726/5 |
| 7,702,794 B1* | 4/2010 | Hall et al. | 709/227 |
| 7,823,192 B1* | 10/2010 | Fultz et al. | 726/7 |
| 8,010,783 B1* | 8/2011 | Cahill | 713/155 |
| 2001/0044894 A1* | 11/2001 | Saito et al. | 713/156 |
| 2002/0174344 A1* | 11/2002 | Ting | 713/185 |
| 2003/0033535 A1* | 2/2003 | Fisher et al. | 713/185 |
| 2003/0159067 A1* | 8/2003 | Stirbu | 713/201 |
| 2003/0208411 A1* | 11/2003 | Estes et al. | 705/26 |
| 2004/0221045 A1* | 11/2004 | Joosten et al. | 709/227 |
| 2004/0260942 A1* | 12/2004 | Jamieson et al. | 713/201 |
| 2005/0044377 A1* | 2/2005 | Huang | 713/182 |
| 2005/0091539 A1 | 4/2005 | Wang et al. | |
| 2005/0193198 A1* | 9/2005 | Livowsky | 713/168 |
| 2006/0195893 A1* | 8/2006 | Caceres et al. | 726/8 |
| 2006/0230438 A1* | 10/2006 | Shappir et al. | 726/8 |
| 2008/0072301 A1* | 3/2008 | Chia et al. | 726/8 |
| 2009/0019534 A1* | 1/2009 | Bakshi et al. | 726/6 |

* cited by examiner

METHOD FOR IMPLEMENTING UNIFIED AUTHENTICATION

RELATED APPLICATIONS

This application claims priority to PCT Application No. PCT/CN2005/002127 filed Dec. 8, 2005, and Chinese Patent Application No. 200510072981.1 filed May 16, 2005.

FIELD OF THE INVENTION

The present invention relates to a network authentication method in the environment of the Internet, and particularly to a method of providing unified authentication for user logon in integrated and merged service processes provided by a plurality of Internet information systems or Internet service providers.

BACKGROUND OF THE INVENTION

Currently, a user needs to undergo respective procedures for logon authentication before he or she can access each of the services provided by a plurality of Internet information systems and Internet service providers. In this way, the user has to remember several user passwords, which complicates the use of these systems by the user and increases the probability of error occurrence. Besides, the risk of suffering from illegal interception and damage is heightened, leading to security loosening of security. Furthermore, if the user forgets one of the user passwords, he or she cannot carry out a corresponding task and has to ask for help from an administrator. The user can only wait before regaining his or her password. This contributes to the overhead of system and security management resource and lowers work efficiency.

SUMMARY OF THE INVENTION

An object of the present invention is to provide a method for implementing unified authentication for user logon which enables a user to access all authorized resources with only authenticating the user identity once, instead of authenticating several times to access all of the resources. With this method, it is possible to improve the work efficiency of a network user, reduce the cost of network operation and enhance the network security.

According to one aspect of the present invention, there is provided a method for implementing unified authentication for user logon, the method comprising the steps of: establishing an authentication server; creating a user authentication account number in the authentication server; storing user information which the user uses in a plurality of systems into the authentication server; associating, in the authentication server, the created user authentication account number with said user information which the user uses in the plurality of systems; and providing an authentication flag to the client of the user by the authentication server based on the association between the user authentication account number and said user information which the user uses in the plurality of systems established in the authentication server so that the user can log on to the plurality of systems using the authentication flag.

The present invention is primarily applied to provide a unified authenticating mechanism for user logon authentication in integrated and merged service processes provided by a plurality of Internet information systems or Internet providers. Thus, the user can access all authorized application systems or service providers with only one logon authentication, instead of conducting logon authentication every time the user accesses an application system or service provider.

BRIEF DESCRIPTION OF THE DRAWINGS

The above object, advantages and features of the present invention will be apparent from the following detailed description of the several embodiments taken in conjunction with the drawings, in which.

DETAILED DESCRIPTION

According to the method for implementing unified authentication of the present invention, a user needs to conduct logon authentication with an authentication server only once, and after that, no user authentication is required when the user accesses other application systems and information systems. For clearly describing this solution, the scheme of the present invention will be divided into three sections, with the first section describing preparation work before an authentication system runs, the second section explaining a user's logon, and the third section illustrating access to other application systems by the user after the above logon.

Below, in the description of the present invention with reference to the figures, related terms are defined as follows.

Authentication server: a server used to conduct unified logon authentication; Authentication account number: an account number used by a user to log on to the same authentication server; user token: a credential for authentication issued by the authentication server to the user after he or she logs on to the authentication server successfully; client of the user: a client-side program used by the user to connect to and access the authentication server and other application systems.

Figure 1:
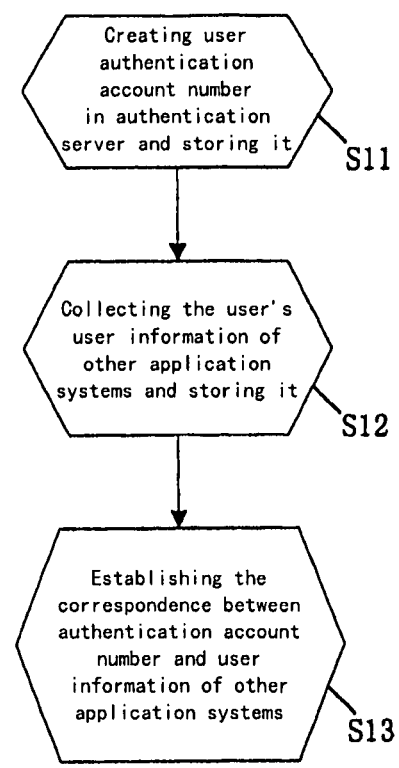
FIG. 1 is a flowchart for creating, collecting and storing data in the method for implementing unified authentication according to one embodiment of the present invention.

FIG. 1 is a flowchart for creating, collecting and storing data in the method for implementing unified authentication according to the present invention.

Referring to FIG. 1, at step S11, a user authentication account number needs to be created in an authentication server (e.g., allocating a user name and password to the user) and stored permanently (e.g., in a database or Lightweight Direct Access Protocol "LDAP") so that the user can log on to the authentication server.

At step S12, the user's user information, for example, user name for logon, in other application systems needs to be collected into the authentication server and stored permanently.

At step S13, the correspondence between the created user authentication account number and the user information used in other application systems needs to be established to ensure that the application information of the user used in other application systems can be retrieved through the information of the user authentication account number, that is, the user's user information used in other application systems can be obtained by means of one authentication account number of the user. The correspondence as described above is stored in a persistent storage device.

Figure 2:
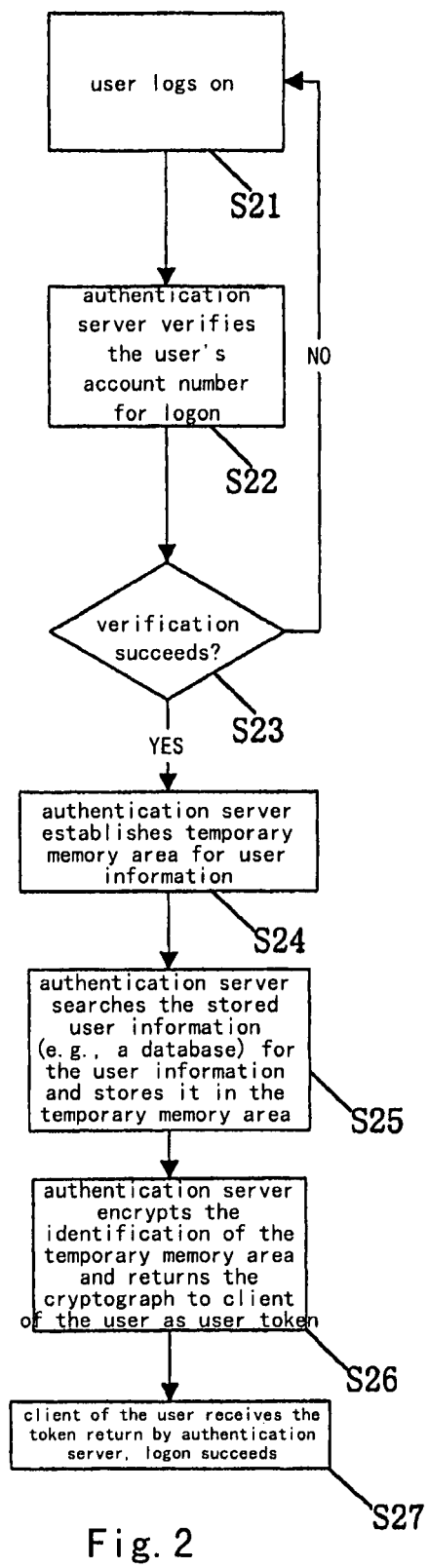
FIG. 2 is a main flowchart for logging on to an authentication server and authentication system by using the method for implementing unified authentication according to one embodiment the present invention.

FIG. 2 is a main flowchart for the user logging on to the authentication server and the authentication system in the method for implementing unified authentication according to one embodiment of the present invention.

Referring to FIG. 2, the primary tasks to be fulfilled by the authentication system and the client of the user when the user logs on the authentication server during the running of the system are depicted.

Now, a description will be made at the primary tasks to be completed by the client and the authentication server in the process of a user logon through the client of the user. The user attempts to log on to the authentication server at step S21. The authentication r server verifies the authentication account number of the user at step S22, and the logon will fail if the verification fails. At step S23, it is determined whether the verification of the authentication account number succeeds, and if it does, the authentication server allocates a temporary memory area to the user at step S24. It is necessary to allocate a unique identification to the temporary memory area; the identification can be generated in a random manner. Additionally, a timer is set and started simultaneously for the temporary memory area, which will be withdrawn by the system if no heartbeat request from the client of the user is received for a predetermined time period. Also, this memory area should be taken back if the user sends out logout information. On the other hand, the timer will be reset to an initial status for retiming if a heartbeat request from the client of the user is received within a predetermined time period. At step S25, the authentication server searches the stored user information (e.g., a database) for the user's user information (e.g., user name for logon) used in other application systems and stores the obtained information in the temporary memory area. The authentication server encrypts the unique identification of the temporary memory area at step S26. Here, it is necessary to guarantee that the encrypted cryptograph can be decrypted. The generated cryptograph is returned to the client of the user as a user token. At step S27, the logon is successful when the client of the user receives the user token sent back from the authentication server. The client of the user temporarily stores the token for further use during access to other application systems. Additionally, the client of the user sends a heartbeat request to the authentication server at a regular interval so that the latter will not withdraw the temporary memory area allocated for the user.

Figure 3:
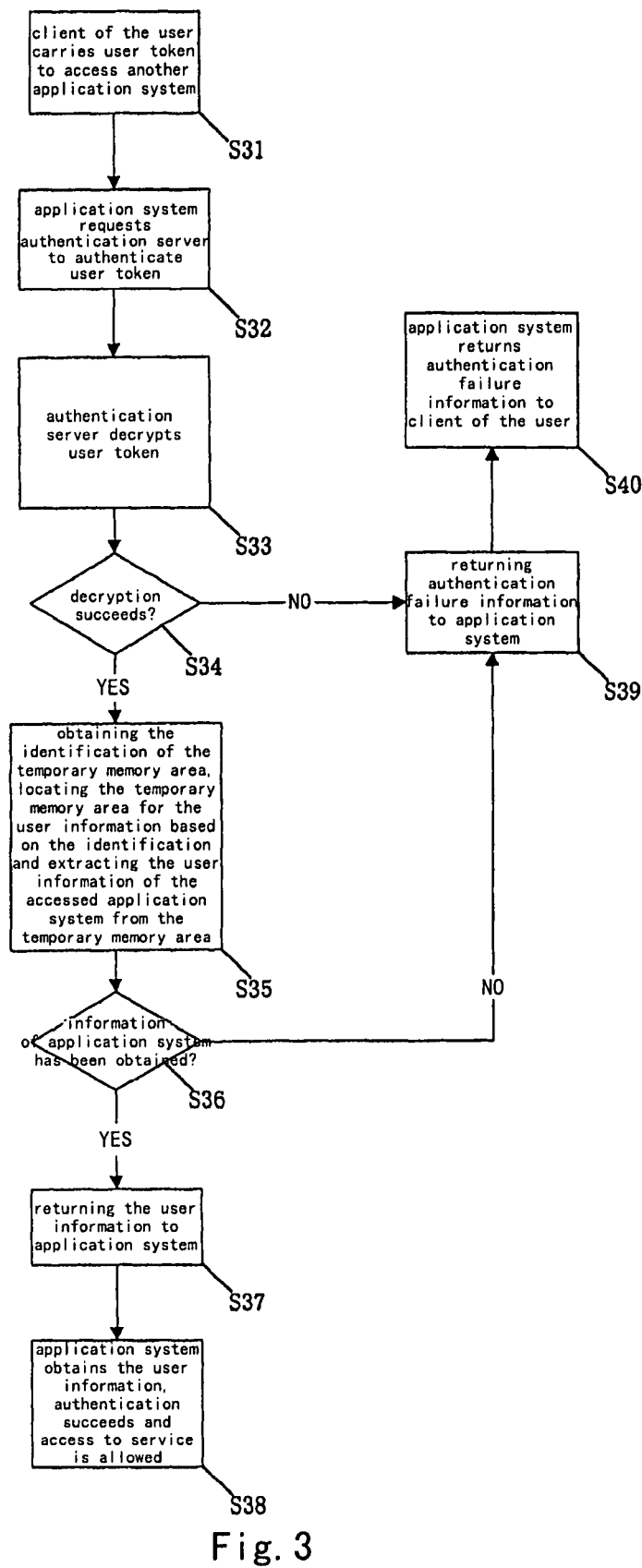
FIG. 3 is a flowchart for primary operation of the authentication server, the client of the user and the application system server when the user accesses other application systems after a successful logon into the authentication server with the method for implementing unified authentication according to the present invention.

FIG. 3 is a flowchart showing the primary operations of the authentication server, the client of the user and the application system server when the user accesses other application systems after a successful logon into the authentication server in the method for implementing unified authentication according to the present invention.

Referring to FIG. 3, when the user wants to access other application systems after a successfully logging on to the authentication server, the authentication server, the client of the user and the application system server operate mainly as follows: At step S31, the client of the user takes the obtained user token to access another application system. At step S32, the application system server requests the authentication server to authenticate the user token. In particular, the application system receives the access request from the client of the user, acquires the user token and sends an authentication request to the authentication server along with the user token.

At step S33, having received the authentication request from the application system, the authentication server retrieves the user token in the request from the application system and decrypts it. Then it is determined whether this decryption succeeds at step S34. If it is successful, the flow goes to step S35, where the authentication server, after a successful decryption of the user token at step S33, obtains the identification of the temporary memory area, locates the temporary memory area based on the identification and acquires the user's user information of the application system from this temporary memory area. On the other hand, the flow goes to step S39 if the decryption fails at step S34. The authentication server returns authentication failure information to the application system at step S39, and then the application system returns this authentication failure information to the client of the user at step S40. Now, proceeding to step S36, the authentication server determines whether the information on the application system has been obtained. The flow proceeds to step S37 if the determination result is "YES". The authentication server returns the user information to the application system at step S37, and the flow enters step S38 where the application system receives the information returned by the authentication server and determines whether there is user information. If there is, this authentication succeeds, and the user is allowed to use the application system. Otherwise, if the determination result at step S36 is "NO", the flow returns to step S39, where the authentication server returns authentication failure information to the application system. Again, the application system returns this authentication failure information to the client of the user at step S40.

Relevant terms used in implementing the above steps are defined as follows. Authentication user name: a user name used when the user logs on to the authentication server; service user name: a user name the user registers with another information system or SP service system, and the user can use this service user name and service user password to log on to a SP service system directly (in practice, the service user name is referred to as the user name registered with one of the SPs, for example, the user Zhang San has a user name of zhangsan@263.net with 263 service and a user name of 0401210003 with Unicorn Service of Uni-Video (Baoshitong)); SP: service provider; SP_ID: the identification of a service provider.

In the method according to the present embodiment.

According to one embodiment of a method of the present invention, first, the user needs to create a user account number (e.g., a user name and a password) in the authentication server so as to log on to the authentication server using this user account number later. Such an account number can be created before the computer is sold to the user and given to the user along with the computer. The account number can also be created when the user registers with the authentication server after he or she has purchased a computer.

Second, the user names which the user utilizes for respective information systems or SPs and corresponding SP_IDs need to be collected into the authentication server and stored. In reality, such information will be recoded in the authentication server if the user applies for other SP service: through a Lenovo system and the application is admitted. In other kinds of applications, the above information can also be built into the authentication server by the user or administer.

Third, the correspondence between the authentication user names and the service user names needs to be established for the collected information. The relationship can be a one-to-many relationship and depicted in data structure, that is, the user on the authentication server has one or more user names of other service systems. Such correspondence is established by the system when the user has become registered system user and other service user names of the user are added.

Figure 4:
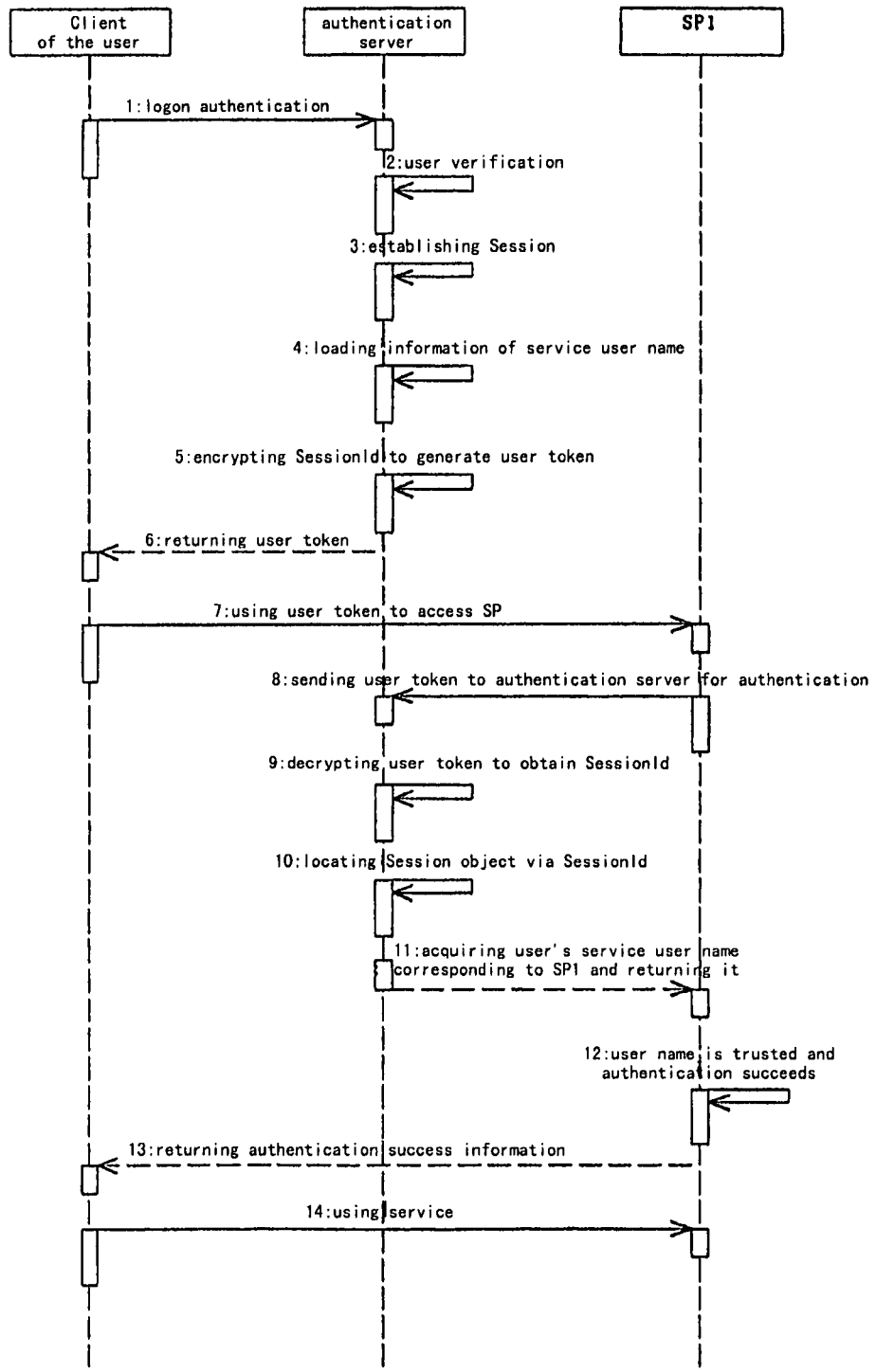
FIG. 4 is a sequence diagram for a user authentication process in the method for implementing unified authentication according to the present invention.

FIG. 4 is a sequence diagram for a user authentication process in the method for implementing unified authentication according to the present invention. Referring to FIG. 4, the user authentication process in the method for implementing unified authentication according to the present invention goes as follows.

1. The user utilizes his or her account number for the authentication server (authentication user name and password) to log on to the authentication server by means of a client, which can be a browser or an application.

2. The authentication server verifies the account number with which the user logs on and checks whether it coincides with that stored in the system.

3. After the check on the user authentication credential succeeds, the authentication server constructs a Session object for the user so as to conduct temporary storage. A Session object is a data container for holding data of key-value pair. A Session object is primarily used to save some information related to the user. Each Session object has an attribute of a SessionID, which is unique and can be generated randomly by the authentication system. Table 1 below shows an example of a Session object:

TABLE 1

| Attribute name | Attribute value |
|---|---|
| SessionID | A59BA9A3EAE516F1F815E455D4CF324A |
| Key2 | Value2 |
| Key3 | Value3 |
| ... | ... |

As described above, a Session object is a data container for holding data of a key-value pair, such as a Hashtable, and is used to save some information related to the user. Each Session object has an attribute of a SessionID, which should be unique and thus can be distinguished from any other Session object. The attribute value of Session object can be generated randomly by the authentication system. As shown in above example, the SessionID is the attribute name, and A59BA9A3EAE516F1F815E455D4CF324A is the attribute value. A Session object can accommodate many key-value pairs, in which 'value' can be acquired via 'key'.

4. The authentication server loads list information of the service user names of the user by using the correspondence between the authentication user names and the service user names, and stores the information in the Session object for the user. The Session object will be destroyed when the user logs out or when the user session expires.

5. The authentication server encrypts the user's SessionID with a symmetrical encryption algorithm (e.g., DES, 3DES, IDEA) and its key. A user token is generated after the encryption and issued to the client of the user.

6. The client of the user needs to buffer the returned user token after receiving it so that the user token can be used in logon authentication when the user accesses other information systems or SP services.

7. It should be noted that the client of the user has to maintain the session with the authentication server throughout the process of using the information systems or SP services by the user. Otherwise, if the session expires, the user token will be invalidated.

8. When the user accesses another application system or SP through the client, the client passes the user token to the SP as the credential for logon authentication.

9. The SP sends the user token of the user along with its SP_ID to the authentication server after receiving the logon request from the user.

10. The authentication server decrypts the user token with the key and algorithm used in the previous encryption after receiving the authentication request from the SP.

11. If the user token is legal, the authentication server will obtain a SessionID after the decryption and search the Session object established for the user with help of the SessionID.

12. The authentication server retrieves the service user name corresponding to the above SP_ID from the user's Session object stored in the memory.

13. The authentication server returns the service user name to the SP.

14. Having received the service user name, the SP believes the user is trusted and uses this user name to authorize the user for service usage.

15. When the user logs out of the authentication server, the authentication server destroys the user's Session and, at this moment, the user token becomes invalid. If the SP uses this invalid token in the authentication conducted on the authentication server, the latter cannot locate a Session object based on the token and thus returns authentication failure information to the SP.

Data structures used in the embodiment of the present invention are illustrated below.

TABLE 2

Authentication user table

| Name | Code | Description | Data type |
|---|---|---|---|
| Authentication user ID | ID | Primary key in table, self-increment, positive integer, uniqueness in the system | NUMBER (20) |
| Authentication user name | LoginName | Authentication user name | VARCHAR2 (50) |
| Authentication user password | Password | Authentication user password | VARCHAR2 (20) |

In Table 2, the authentication user ID is the primary key in the Authentication User Table and can be a self-incrementing positive integer.

The authentication user name is a user name which the user utilizes to log on to the authentication server.

The authentication user password is a password which the user utilizes to log on to the authentication server.

Table 3: Service User Table

TABLE 3

Service user table

| Name | Code | Description | Data type |
|---|---|---|---|
| Service user ID | UserId | Primary key in table, self-increment, positive integer, uniqueness in the system | NUMBER (20) |
| Service user name | UserName | Service user name | VARCHAR2 (50) |
| Authentication user ID | ID | Authentication user ID | NUMBER (20) |
| Service provider ID | SP_ID | Identification of Service provider | NUMBER (20) |

As shown in Table 3, the service user ID is the primary key in the Service User Table and can be a self-incrementing positive integer.

The service user name is a user name which the user utilizes to log on and use the service provided by a certain service provider.

The authentication user ID is an outer key in the table and used to authenticate the primary key. The Service provider ID is a unique identification of the service provider which provides the service for the user.

Although the present invention has been illustrated above with reference to the detailed embodiments, the present invention is not limited to the described embodiments and defined only by the appended claims. It will be understood that any modification and change made to the embodiments by those skilled in the art is within the scope and spirit of the present invention.

What is claimed is:

1. A method for implementing unified authentication for a user logon for a plurality of application systems, the method comprising the steps of:

logging on an authentication server by a user by:

sending the authentication server an authentication account number by the user, the authentication server having stored therein permanently user information which the user uses in accessing the plurality of application systems, the authentication account number being created beforehand and stored in the authentication server permanently, and the authentication account number of a specific user being associated with the user information of that specific user;

establishing a temporary memory area for the user by the authentication server in the authentication server, and allocating a unique identification to said temporary memory area for the user;

verifying the authentication account number, and providing an authentication flag to the user by the authentication server;

storing the received authentication flag by the user and sending a certain request to the authentication server regularly to keep the authentication flag valid during the logon of the user on the authentication server;

accessing one application system among the plurality of application systems by the user by:

sending by the user the authentication flag to the application system;

requesting, by said application system, the authentication server to verify said authentication flag;

retrieving, if the authentication flag is verified successfully, by the one application system from the authentication server user information which the user uses in accessing the one application system;

receiving, by the one application system, the user information of said application system from said authentication server and allowing the user to log on the one application system, wherein if the user accesses another application system different from the one application system when it has a valid authentication flag, the user accesses the other application system by using the verified authentication flag without logging on the authentication server once again.

2. The method according to claim 1, further comprising a step of searching the user information from the stored user information and storing the user information in the temporary memory area for the user by the authentication server.

3. The method according to claim 1, further comprising a step of encrypting the identification of said temporary memory area for the user and returning the generated cryptograph to the user as said authentication flag by the authentication server.

4. The method according to claim 2, further comprising a step of encrypting the identification of said temporary memory area for the user and returning the generated cryptograph to the client of the user as said authentication flag by the authentication server.

5. The method according to claim 3, wherein verifying said authentication flag comprises decrypting said authentication flag by the authentication server.

6. The method according to claim 4, wherein verifying said authentication flag comprises decrypting said authentication flag by the authentication server.

7. The method of claim 5, further comprising the step of obtaining the identification of temporary memory area for the user by the authentication server when the decryption of said authentication flag succeeds so as to determine said temporary memory area for the user.

8. The method of claim 7, further comprising the step of extracting the user information of said application system from said temporary memory area for the user and sending it to said application system by the authentication server.

* * * * *